US009993946B2

(12) United States Patent
Matsen et al.

(10) Patent No.: US 9,993,946 B2
(45) Date of Patent: Jun. 12, 2018

(54) METHOD AND APPARATUS FOR FORMING TOOLING AND ASSOCIATED MATERIALS THEREFROM

(71) Applicant: The Boeing Company, Chicago, IL (US)

(72) Inventors: Marc R. Matsen, Seattle, WA (US); Gregory J. S. Hickman, St. Louis, MO (US); William C. Dykstra, Rockford, MI (US)

(73) Assignee: The Boeing Company, Chicago, IL (US)

( * ) Notice: Subject to any disclaimer, the term of this patent is extended or adjusted under 35 U.S.C. 154(b) by 224 days.

(21) Appl. No.: 14/818,997

(22) Filed: Aug. 5, 2015

(65) Prior Publication Data
US 2017/0036310 A1 Feb. 9, 2017

(51) Int. Cl.
*B29C 70/34* (2006.01)
*B29C 33/06* (2006.01)
(Continued)

(52) U.S. Cl.
CPC .............. *B29C 33/06* (2013.01); *B29C 70/44* (2013.01); *B29K 2105/12* (2013.01);
(Continued)

(58) Field of Classification Search
CPC ....... B29C 33/06; B29C 70/06; B29C 70/345; B29C 70/44; B23P 15/24; B29K 2105/12;
(Continued)

(56) References Cited

U.S. PATENT DOCUMENTS 4,816,965 A 3/1989 Drits
5,591,370 A 1/1997 Matsen et al.
(Continued)

FOREIGN PATENT DOCUMENTS

| CN | 101368243 | 2/2009 |
| RU | 2383630 | 3/2010 |
| SU | 1520732 | 10/1991 |

OTHER PUBLICATIONS

AK Steel, "316/316 l data sheet", 2007 on aksteel.com (Year: 2007).*
(Continued)

*Primary Examiner* — Alison L Hindenlang
*Assistant Examiner* — Yunju Kim
(74) *Attorney, Agent, or Firm* — Kunzler, PC

(57) ABSTRACT

Described herein is a method of forming tooling used to form a material. The method includes positioning a first susceptor made from a first susceptor material between first and second dies. At least one of the first and second dies includes a forming surface having a desired shape. The method further includes positioning a second susceptor made from a second susceptor material between the first and second dies such that the first susceptor is interposed between the second susceptor and the forming surface. Additionally, the method includes positioning a first bladder between the first and second dies such that the second susceptor is interposed between the first bladder and the first susceptor. Also, the method includes inflating the first bladder to concurrently deform the first susceptor and second susceptor into the desired shape.

19 Claims, 9 Drawing Sheets

(51) Int. Cl.
  *B29C 70/06* (2006.01)
  *B29C 70/44* (2006.01)
  *B29K 105/12* (2006.01)
  *B29K 105/00* (2006.01)

(52) U.S. Cl.
  CPC .... *B29K 2105/256* (2013.01); *B29K 2905/00* (2013.01); *B29K 2905/12* (2013.01)

(58) Field of Classification Search
  CPC .......... B29K 2105/256; B29K 2905/00; B29K 2905/12
  USPC ........................................................ 264/403
  See application file for complete search history.

(56) References Cited

U.S. PATENT DOCUMENTS

| | | | |
|---|---|---|---|
| 5,683,607 A | 11/1997 | Gillespie et al. | |
| 5,705,794 A | 1/1998 | Gillespie et al. | |
| 5,728,309 A | 3/1998 | Matsen et al. | |
| 5,914,064 A | 6/1999 | Gillespie et al. | |
| 5,935,346 A | 8/1999 | Couderchon et al. | |
| 6,091,063 A | 7/2000 | Woods | |
| 6,528,771 B1 | 3/2003 | Matsen et al. | |
| 6,566,635 B1 | 5/2003 | Matsen et al. | |
| 6,576,877 B2 | 6/2003 | Dabelstein et al. | |
| 6,747,253 B1 * | 6/2004 | Firth .................... | H05B 6/105 219/634 |
| 6,773,513 B2 | 8/2004 | Ludtka | |
| 7,161,124 B2 | 1/2007 | Kisner et al. | |
| 7,534,980 B2 | 5/2009 | Wilgen et al. | |
| 7,745,765 B2 | 6/2010 | Kisner et al. | |
| 7,897,516 B1 | 3/2011 | Kinder et al. | |
| 7,905,128 B2 | 3/2011 | Matsen et al. | |
| 8,343,402 B1 | 1/2013 | Matsen et al. | |
| 8,480,823 B1 | 7/2013 | Matsen et al. | |
| 2004/0256383 A1 | 12/2004 | Fischer et al. | |
| 2010/0018271 A1 | 1/2010 | Matsen et al. | |
| 2010/0147834 A1 | 6/2010 | Witte et al. | |
| 2011/0000588 A1 | 7/2011 | Bogicevic et al. | |
| 2012/0067100 A1 | 3/2012 | Stefansson et al. | |
| 2012/0080424 A1 | 4/2012 | Wiezoreck et al. | |
| 2012/0324908 A1 | 12/2012 | Ludtka et al. | |
| 2014/0219854 A1 | 8/2014 | Matsen | |
| 2014/0326717 A1 | 11/2014 | Matsen et al. | |
| 2016/0316522 A1 | 10/2016 | Matsen et al. | |

OTHER PUBLICATIONS

Office Action for Russian Patent Application No. 2016103655/02 dated Jul. 3, 2017.
Notice of Allowance for U.S. Appl. No. 13/758,609 dated Jul. 29, 2016.
Office Action for Chinese Patent Application No. 201380072196.9 dated Jul. 6, 2016.
Imam et al., Abstract to "Fatigue and microstructural properties of quenched Ti-GAl-4V," http://link.springer.com/article/10.1007/BF02651620#page-2, accessed Jan. 14, 2016.
International Search Report and Written Opinion for Application No. PCT/US2013/076912 dated Apr. 16, 2014.
Ye et al., "Blended elemental powder densification of Ti-6Al-4V by hot pressing," J. Materials Research, 2011, pp. 95-969, vol. 26, Issue 8.
Ludtka, G. M., Exploring Ultrahigh Magnetic Field Processing of Materials for Developing Customized Microstructures and Enhanced Performance, Final Technical Report, Mar. 2005, pp. 1-84, Oak Ridge National Laboratory.
Notice of Allowance for U.S. Appl. No. 14/697,418 dated Dec. 21, 2017.
Introduction to Steel Heat Treatment, ASM Handbook, 2013, pp. 1-5, vol. 4A, ASM International.

* cited by examiner

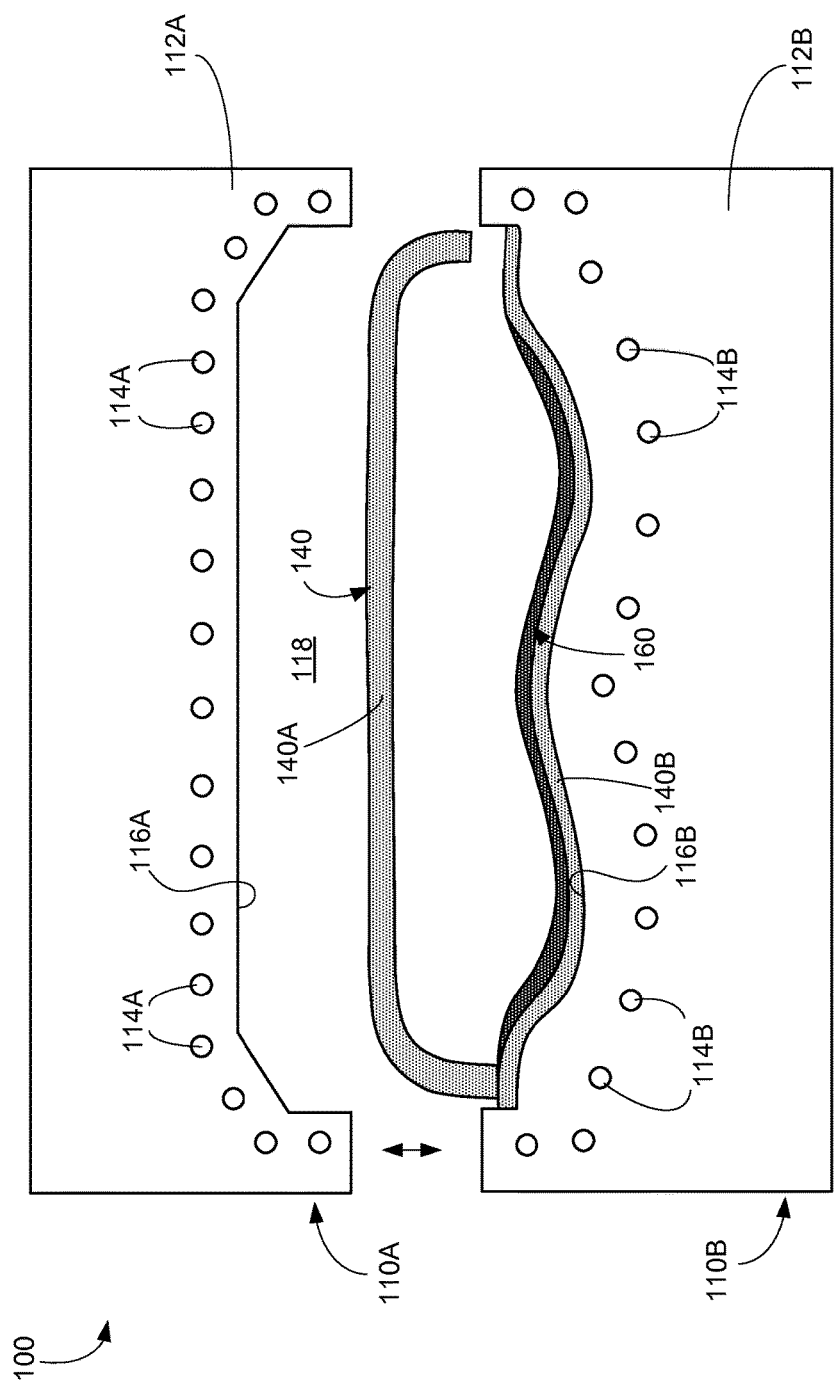

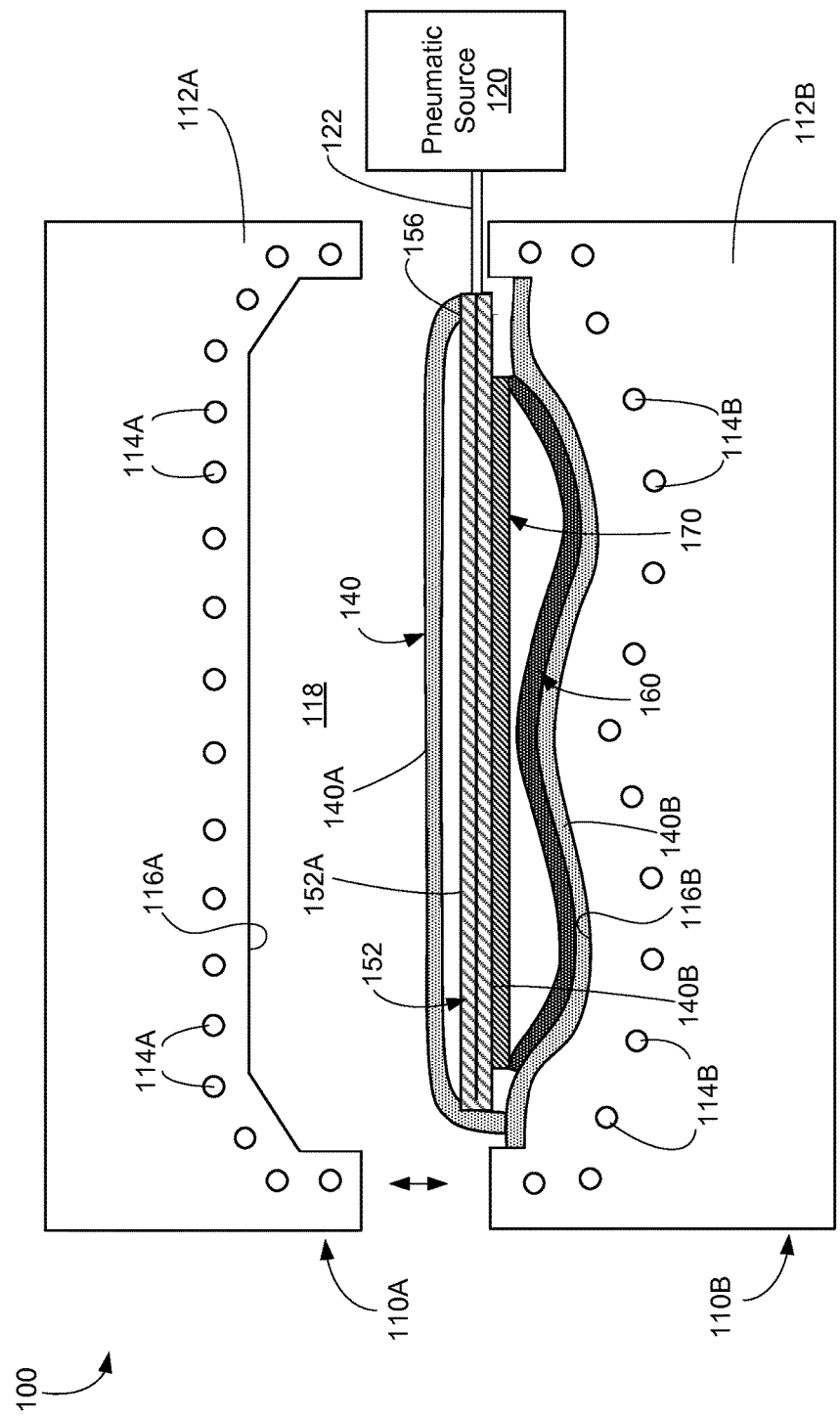

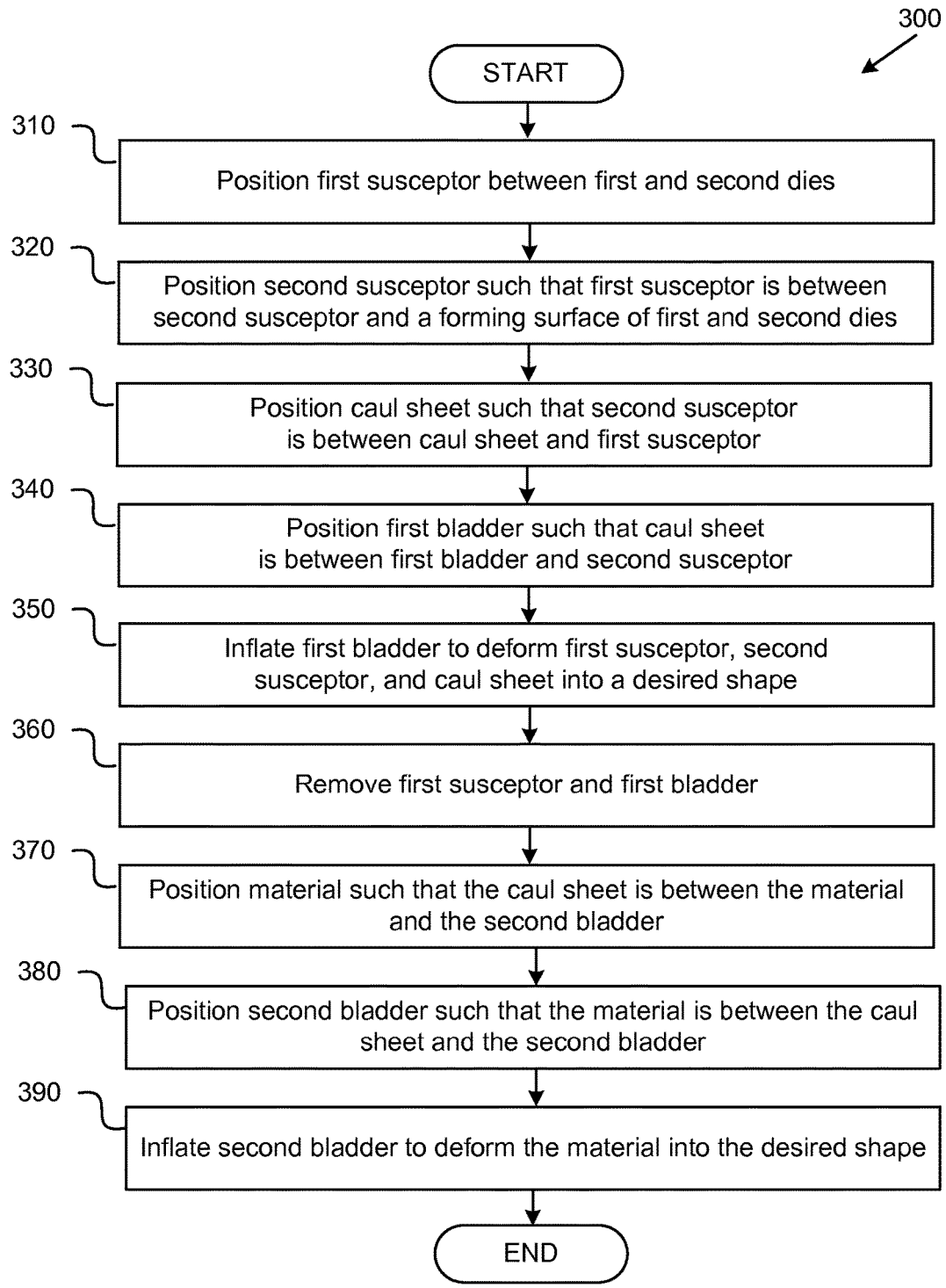

METHOD AND APPARATUS FOR FORMING TOOLING AND ASSOCIATED MATERIALS THEREFROM

FIELD

This disclosure relates generally to forming materials into desired shapes, and more particularly to forming tooling used to form materials into desired shapes.

BACKGROUND

Many materials are formed into desired shapes using a combination of heat and pressure. Some materials, however, tend to expand differently than the tooling used to form the materials when subject to heat. Discrepancies between the coefficient of thermal expansion of materials being formed and tooling used to form the materials may induce defects in the materials. Accordingly, some methods utilize tooling sheets specifically designed to reduce coefficient of thermal expansion discrepancies. Traditional methods for making such tooling sheets can be difficult, expensive, and time-consuming.

Some conventional methods for forming materials into desired shapes use inductive heating to heat the materials. Inductive heating typically utilizes specifically-shaped susceptors to heat and shape the materials. Traditional processes for shaping such susceptors also are difficult, expensive, and time-consuming.

SUMMARY

The subject matter of the present application provides embodiments of methods and apparatuses for forming tooling, and associated methods and apparatuses for forming materials using the formed tooling, that overcome the above-discussed shortcomings of prior art techniques. The subject matter of the present application has been developed in response to the present state of the art, and in particular, in response to shortcomings of conventional methods and apparatuses for forming tooling used to form materials, such as components made from fiber-reinforced composite materials.

According to some embodiments, a first method of forming tooling used to form a material includes positioning a first susceptor made from a first susceptor material between first and second dies. At least one of the first and second dies includes a forming surface having a desired shape. The first method further includes positioning a second susceptor made from a second susceptor material between the first and second dies such that the first susceptor is interposed between the second susceptor and the forming surface. Additionally, the first method includes positioning a first bladder between the first and second dies such that the second susceptor is interposed between the first bladder and the first susceptor. Also, the first method includes inflating the first bladder to concurrently deform the first susceptor and second susceptor into the desired shape.

In some implementations of the first method, the first susceptor material has a first Curie temperature and the second susceptor material has a second Curie temperature lower than the first Curie temperature. The first method further includes applying a magnetic field to the first susceptor to heat via induction the first susceptor to at least the first Curie temperature prior to inflating the first bladder. The first and second dies each includes embedded electromagnetic coils with the magnetic field being generated by at least one of the electromagnetic coils.

In certain implementations of the first method, the first susceptor material is a low-carbon steel and the second susceptor material is a nickel-iron-molybdenum alloy.

According to some implementations, the first method further includes positioning a caul sheet between the first and second dies such that the second susceptor is interposed between the caul sheet and the first susceptor and the caul sheet is interposed between the first bladder and the second susceptor. Inflating the first bladder concurrently deforms the first susceptor, second susceptor, and caul sheet into the desired shape. The caul sheet can be made from a material having a coefficient of thermal expansion (CTE) less than about $7 \times 10^{-4}$ in/in/° F. The caul sheet can be made from a nickel-iron alloy.

In some implementations of the first method, the first susceptor includes a first sheet and a second sheet, and the second susceptor includes a third sheet and a fourth sheet interposed between the first sheet and second sheet of the first susceptor. The caul sheet is interposed between the third sheet and fourth sheet of the second susceptor. The first bladder is interposed between the third sheet of the second susceptor and the caul sheet. Deformation of the first susceptor can include deforming the second sheet of the first susceptor into the desired shape. Deformation of the second susceptor can include deforming the fourth sheet of the second susceptor into the desired shape. The first method may further include moving the first and second dies toward each other to enclose the first susceptor, second susceptor, caul sheet, and first bladder between the first and second dies prior to inflating the first bladder.

According to another embodiment, a second method of forming a component made from a composite material includes positioning a first susceptor made from a first susceptor material between first and second dies. At least one of the first and second dies includes a forming surface that has a desired shape. The second method includes positioning a second susceptor made from a second susceptor material between the first and second dies such that the first susceptor is interposed between the second susceptor and the forming surface. Also, the second method includes positioning a caul sheet between the first and second dies such that the second susceptor is interposed between the caul sheet and the first susceptor. Further, the second method includes positioning a first bladder between the first and second dies such that the caul sheet is interposed between the first bladder and the second susceptor. The second method additionally includes inflating the first bladder to concurrently deform the first susceptor, second susceptor, and caul sheet into the desired shape. After inflating the first bladder to deform the first susceptor, second susceptor, and caul sheet into the desired shape, the second method includes removing the first susceptor and first bladder from between the first and second dies. After removing the first susceptor and first bladder from between the first and second dies, the second method includes positioning an unconsolidated composite material between the first and second dies such that the caul sheet is interposed between the unconsolidated composite material and the second susceptor, and positioning a second bladder between the first and second dies such that the unconsolidated composite material is interposed between the second bladder and the caul sheet. Further, the second method includes inflating the second bladder to deform the unconsolidated composite material into the desired shape.

In certain implementations of the second method, the first susceptor material has a first Curie temperature and the second susceptor material has a second Curie temperature lower than the first Curie temperature. The second method can further include applying a first magnetic field to the first susceptor to heat via induction the first susceptor to the first Curie temperature prior to inflating the first bladder. After removing the first susceptor and first bladder from between the first and second dies, the second method further includes applying a second magnetic field to the second susceptor to heat via induction the second susceptor to the second Curie temperature prior to inflating the second bladder. The first and second dies can each comprise embedded electromagnetic coils, where the first and second magnetic fields are generated by at least one of the electromagnetic coils. The unconsolidated composite material can be configured to melt at a melting temperature, where the second Curie temperature is at least as high as the melting temperature of the unconsolidated composite material. The first Curie temperature can be at least about 1,400° F. and the second Curie temperature can be less than about 1,000° F.

According to some implementations, prior to positioning the unconsolidated composite material between the first and second dies, the second method further includes pre-configuring the unconsolidated composite material into a shape complementing the desired shape.

In certain implementations of the second method, the first bladder is made from a first material and the second bladder is made from a second material different than the first material. The first bladder can be made from a low-carbon steel and the second bladder can be made from an aluminum alloy.

According to yet some implementations of the second method, the caul sheet has a first coefficient of thermal expansion (CTE) and the thermoplastic composite material has a second CTE. The first CTE is between about 0.9 and about 1.1 times the second CTE.

In some implementations of the second method, the second susceptor includes a first sheet and a second sheet, and the caul sheet is interposed between the first sheet and second sheet of the second susceptor. The second bladder is interposed between the first sheet and second sheet of the second susceptor. The unconsolidated composite material is interposed between the second sheet of the second susceptor and the second bladder.

According to another embodiment, an apparatus for concurrently forming a caul sheet and a low-temperature susceptor into a desired shape is disclosed. The caul sheet and low-temperature susceptor are configured to form a composite material into the desired shape. The apparatus includes first and second opposing dies each having electromagnetic coils configured to generate a magnetic field. At least one of the first and second opposing dies includes a forming surface having a desired shape. The apparatus also includes an inflatable bladder interposed between the first and second opposing dies such that the caul sheet and low-temperature susceptor are positionable between the inflatable bladder and the forming surface of the at least one of the first and second opposing dies. Additionally, the apparatus includes a high-temperature susceptor interposed between the first and second opposing dies such that the high-temperature susceptor is positionable between the low-temperature susceptor and the forming surface of the at least one of the first and second opposing dies.

The described features, structures, advantages, and/or characteristics of the subject matter of the present disclosure may be combined in any suitable manner in one or more embodiments and/or implementations. In the following description, numerous specific details are provided to impart a thorough understanding of embodiments of the subject matter of the present disclosure. One skilled in the relevant art will recognize that the subject matter of the present disclosure may be practiced without one or more of the specific features, details, components, materials, and/or methods of a particular embodiment or implementation. In other instances, additional features and advantages may be recognized in certain embodiments and/or implementations that may not be present in all embodiments or implementations. Further, in some instances, well-known structures, materials, or operations are not shown or described in detail to avoid obscuring aspects of the subject matter of the present disclosure. The features and advantages of the subject matter of the present disclosure will become more fully apparent from the following description and appended claims, or may be learned by the practice of the subject matter as set forth hereinafter.

BRIEF DESCRIPTION OF THE DRAWINGS

In order that the advantages of the subject matter may be more readily understood, a more particular description of the subject matter briefly described above will be rendered by reference to specific embodiments that are illustrated in the appended drawings. Understanding that these drawings depict only typical embodiments of the subject matter, they are not therefore to be considered to be limiting of its scope. The subject matter will be described and explained with additional specificity and detail through the use of the drawings, in which:

FIG. 3 is a schematic side view of one embodiment of the apparatus of FIG. 1 with the apparatus shown in a third stage of a manufacturing process;

FIG. 4A is a schematic side view of one embodiment of the apparatus of FIG. 1 with the apparatus shown in a fourth stage of a manufacturing process with a substantially non-configured material;

FIG. 8 is a schematic flow diagram of one embodiment of a method of forming a component made from a formable material into a desired shape.

DETAILED DESCRIPTION

Reference throughout this specification to "one embodiment," "an embodiment," or similar language means that a particular feature, structure, or characteristic described in connection with the embodiment is included in at least one embodiment of the present disclosure. Appearances of the phrases "in one embodiment," "in an embodiment," and similar language throughout this specification may, but do not necessarily, all refer to the same embodiment. Similarly, the use of the term "implementation" means an implementation having a particular feature, structure, or characteristic described in connection with one or more embodiments of the present disclosure, however, absent an express correlation to indicate otherwise, an implementation may be associated with one or more embodiments.

Figure 1:
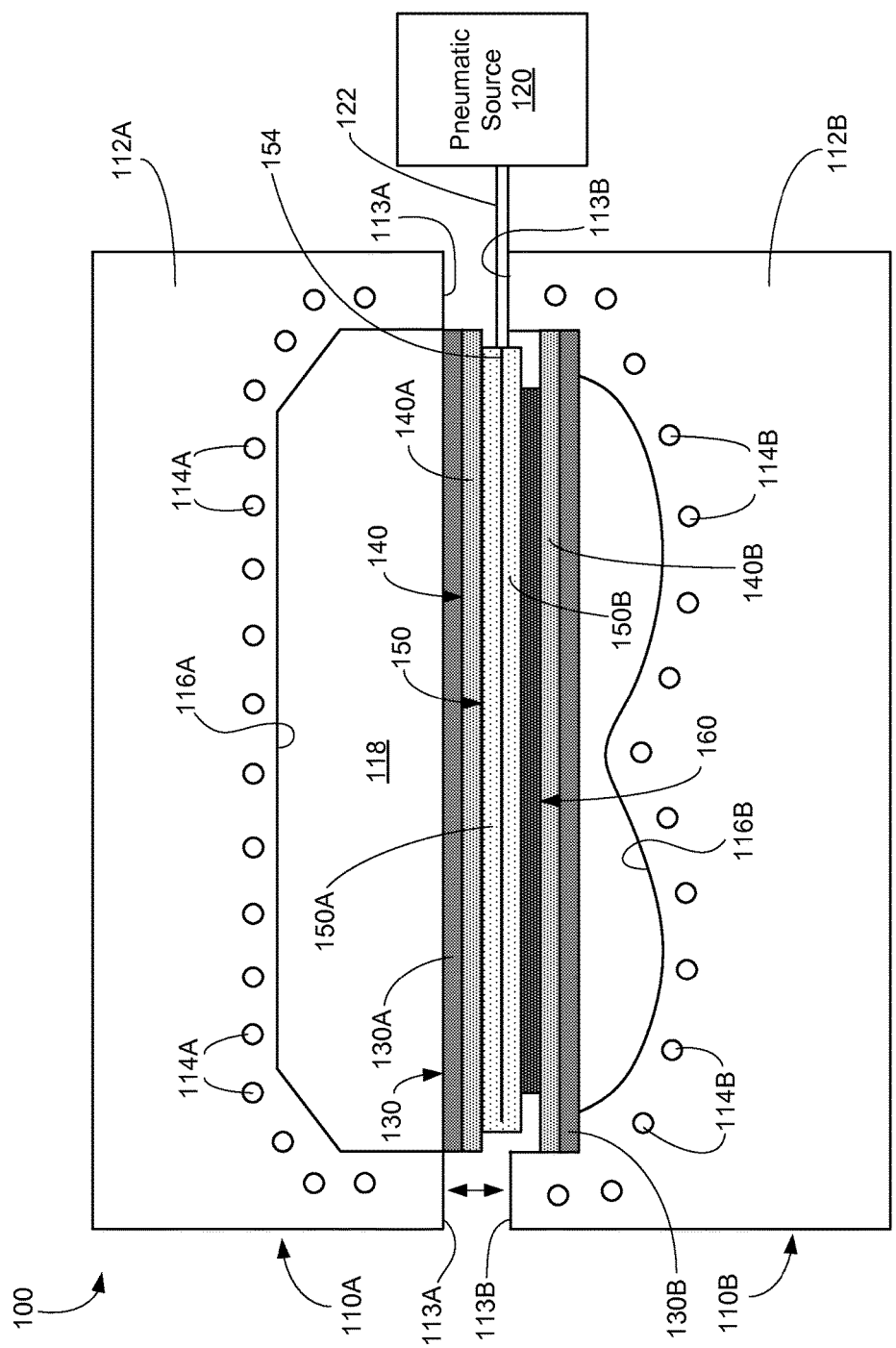
FIG. 1 is a schematic side view of one embodiment of an apparatus for forming a material into a desired shape with the apparatus shown in a first stage of a manufacturing process.

Referring to FIG. 1, and according to one embodiment, an apparatus 100 for forming a material 170 (see, e.g., FIG. 4) into a desired shape is shown. The apparatus 100 includes a first portion 110A and a second portion 110B. The first portion 110A and second portion 110B are movable relative to each other as indicated by the bi-directional arrow. More specifically, the first portion 110A and second portion 110B are movable toward each other to enclose a space 118 between the first and second portions, and movable away from each to open the space 118 between the first and second portions. Although not shown, movement of the first and second portions 110A, 110B of the apparatus 100 relative to each other can be facilitated by one or more actuators, such as a hydraulic or pneumatic actuator, as is known in the art. As defined herein, the material 170 is a component made from any of various materials. Accordingly, reference to the material 170 is a reference to a structure, such as a sheet, made from any of various materials, and not to the type of material per se. The apparatus 100 and associated method 300 forms the material 170 from an unformed component into a formed component.

The first portion 110A includes a first or upper die 112A and the second portion 110B includes a second or lower die 112B. Each of the upper and lower dies 112A, 112B can be made from any of various materials, such as, for example, ceramics, metals, dielectrics, insulators, and combinations thereof, using any of various manufacturing techniques, such as casting, molding, machining, and the like. In one embodiment, both of the upper and lower dies 112A, 112B are made from a ceramic material using a casting technique. The upper and lower dies 112A, 112B include respective interface surfaces 113A, 113B that engage each other to enclose the space 118. The interface surfaces 113A, 113B circumscribe respective forming surfaces 116A, 116B or tool faces of the upper and lower dies 112A, 112B. The forming surfaces 116A, 116B are formed into the upper and lower dies 112A, 112B, respectively, and define the size and shape of the space 118 between the upper and lower dies. When the space 118 is enclosed, such as when the upper and lower dies 112A, 112B are closed, the forming surfaces 116A, 116B exclusively define the size and shape of the space 118.

At least one of the forming surfaces 116A, 116B has a desired shape corresponding with a desired final shape of the material 170 being formed. In other words, the shape of at least one of the forming surfaces 116A, 116B is configured to produce a desired shape of the material 170. In the illustrated embodiment of FIG. 1, the forming surface 116B of the lower die 112B is shaped to have the desired shape. As shown, the forming surface 116B is contoured (e.g., non-planar) to produce a corresponding contour in the material 170. In the illustrated embodiment, the forming surface 116A of the upper die 112B acts as a constraining surface to limit deformation or expansion of materials between the upper and lower dies. However, the shape of the forming surface 116A in the illustrated embodiment does not affect the shape of the material 170 being formed. In other embodiments, the forming surface 116A of the upper die 112A may have the desired shape to produce the desired shape of the material 170. Or, in alternative embodiments, both the forming surfaces 116A, 116B of the upper and lower dies 112A, 112B have a desired shape corresponding with a desired final shape of a respective one of two separate materials 170. In other words, as will be described below, the apparatus 100 can be configured to form one material 170 using the forming surface 116A of the upper die 112A concurrently with the formation of another material 170 using the forming surface 116B of the lower die 112B.

At least one of the first portion 110A and second portion 110B of the apparatus 100 includes one or more electromagnetic coils operable to generate a magnetic field. In the illustrated embodiment, the first portion 110A includes a plurality of electromagnetic coils 114A and the second portion 110B includes a plurality of electromagnetic coils 114B. In certain implementations, each of the electromagnetic coils 114A, 114B is a complete, fully functional, electromagnetic coil. However, in some implementations, each of the electromagnetic coils 114A of the first portion 110A is a portion (e.g., first half) of an electromagnetic coil, and each of the electromagnetic coils 114B of the second portion 110B is another portion (e.g., second half) of an electromagnetic coil. When the first portion 110A and second portion 110B are brought together, each of the electromagnetic coils 114A or first halves engage respective electromagnetic coils 114B or second halves to form a fully functional electromagnetic coil.

Whether forming a portion of an electromagnetic coil, or the entirety of an electromagnetic coil, each of the electromagnetic coils 114A, 114B is operable independently of the other electromagnetic coils in some embodiments, or co-dependently with the other electromagnetic coils in other embodiments to generate a magnetic field. Each of the electromagnetic coils 114A, 114B can be the entirety of, or a portion of, any of various electromagnetic coils. Generally, an electromagnetic coil includes an electrical conductor shaped into a coil, spiral, or helix. For example, in one implementation, each electromagnetic coil 114A, 114B is made from lightly drawn copper tubing, such as water-cooled copper tubing. As an electric current is passed through the coiled electrical conductor, a magnetic field is induced that emanates away from the coiled electrical conductor. The intensity of the magnetic field (e.g., magnetic flux) generated by an electromagnetic coil is dependent on the strength of the current applied to the coiled electrical conductor.

The electromagnetic coils 114A, 114B are coupled to the upper and lower dies 112A, 112B, respectively. In some embodiments, as shown, the electromagnetic coils 114A, 114B are embedded within the upper and lower dies 112A, 112B, respectively. For example, the upper and lower dies 112A, 112B may include a plurality of cavities for receiving a respective one of the electromagnetic coils 114A, 114B. As shown, the cavities, and thus the electromagnetic coils 114A, 114B, formed in each of the upper and lower dies 112A, 112B may be positioned in the die based on the contour of the forming surfaces 116A, 116B of the dies. More specifically, the cavities and electromagnetic coils are arranged in the upper and lower dies 112A, 112B to complement the shape of the contoured surfaces of the dies. In this manner, the electromagnetic coils 114A, 114B are positioned a uniform distance away from the forming surfaces 116A, 116B despite contours in the forming surfaces.

Although not shown, the apparatus 100 may be operably coupled to a controller, power supply, and actuator. The controller controls operation of the apparatus 100 by controlling operation of the power supply and actuator. The power supply can be operably coupled to the electromagnetic coils 114A, 114B to supply electric power to the electromagnetic coils via power lines. The electric power can be an alternating current with a frequency between 60 Hz and 30 kHz in some general implementations, and between 1 kHz and 3 kHz in more specific implementations. The power supply may include a modulator that modulates an electric power signal to the electromagnetic coils 114A, 114B as commanded by the controller. By modulating the electric power signal to the electromagnetic coils 114A, 114B, the controller controls the duration and intensity of the magnetic field generated by the electromagnetic coils 114A, 114B. The controller is also operatively coupled to the actuator to control the opening and closing of the upper and lower dies 112A, 112B.

The controller may be implemented as a hardware circuit comprising custom VLSI circuits or gate arrays, off-the-shelf semiconductors such as logic chips, transistors, or other discrete components. Further, the controller may also be implemented in programmable hardware devices such as field programmable gate arrays, programmable array logic, programmable logic devices or the like. The controller may also be implemented in software for execution by various types of processors. The controller may, for instance, include one or more physical or logical blocks of computer instructions, which may, for instance, be organized as an object, procedure, or function. Nevertheless, the executables of the controller need not be physically located together, but may comprise disparate instructions stored in different locations which, when joined logically together, comprise the module and achieve the stated purpose for the module.

Generally, the apparatus 100 is configured to form a second susceptor 140 into a desired shape using a first susceptor 130, which is configured differently than the second susceptor, and a first bladder 150. The apparatus 100 subsequently utilizes the second susceptor 140 and a second bladder 152 (see, e.g., FIGS. 4A and 4B) to form a material 170 into the desired shape. Additionally, in some embodiments where the coefficient of thermal expansion (CTE) of the material 170 is relatively low, the apparatus 100 is configured to form a caul sheet 160 into the desired shape concurrently with the second susceptor 140. The apparatus 100 can subsequently utilize both the caul sheet 160 and the second susceptor 140 to form the material 170 into the desired shape. The second susceptor 140 and the caul sheet 160 can each be defined as a tooling sheet for forming the material 170 in a manufacturing process.

Referring to FIGS. 1 and 8, according to one embodiment of a method 300 of forming tooling sheets, the first susceptor 130 is positioned between the forming surfaces 116A, 116B of the first and second dies 112A, 112B at 310. Then, at 320, the method 300 includes positioning the second susceptor 140 between the forming surfaces 116A, 116B of the first and second dies 112A, 112B such that the first susceptor 130 is interposed between the second susceptor and the forming surface of the first and second dies having the desired shape (e.g., forming surface 116B in FIG. 1).

The first and second susceptors 130, 140 each include upper and lower sheets that collectively define the respective first and second susceptors. Each sheet can have a substantially sheet-like shape with a thickness that is significantly smaller than a width or length of the sheet. The first susceptor 130 includes an upper sheet 130A and a lower sheet 130B, and the second susceptor 140 likewise includes an upper sheet 140A and a lower sheet 140B. In the illustrated embodiment, positioning the second susceptor 140 between the forming surfaces 116A, 116B at 320 includes positioning the lower sheet 140B of the second susceptor such that the lower sheet 130B of the first susceptor 130 is interposed between the lower sheet 140B of the second susceptor and the forming surface 116B of the lower die 112B, and positioning the upper sheet 140A of the second susceptor such that the upper sheet 130A of the first susceptor is interposed between the upper sheet of the second susceptor and the forming surface 116A of the upper die 112A. In some implementations, the respective upper and lower sheets of the first and second susceptors are coupled to or abut each other when positioned (e.g., stacked) between the upper and lower dies 112A, 112B. However, as shown in FIG. 1, in other implementations, the respective upper and lower sheets of the first and second susceptors are not coupled to or abut each other when positioned between the upper and lower dies 112A, 112B, but may be coupled to or abut each other following formation of the first and second susceptors as will be described below.

The first and second susceptors 130, 140, and each of the upper and lower sheets of the susceptors, are made from an electrically and thermally conductive material that generates heat via electromagnetic induction in the presence of a magnetic field. In some embodiments, the first and second susceptors 130, 140 are made from a ferrous material. More specifically, in certain implementations, the first and second susceptors 130, 140 are made from a ferromagnetic material that generates increasing heat in the presence of a magnetic field until a predetermined threshold or Curie temperature of the susceptors is reached. Such susceptors can be defined as smart susceptors. As portions of a smart susceptor reach the Curie temperature, the magnetic permeability of those portions falls to unity (i.e., the susceptor becomes paramagnetic) at the Curie temperature. This drop in magnetic permeability has two effects. First, the drop in magnetic permeability limits the generation of heat by those portions at the Curie temperature. Second, the drop in magnetic permeability shifts the magnetic flux to the lower temperature portions, causing those portions below the Curie temperature to more quickly heat up to the Curie temperature. Accordingly, thermal uniformity of the first and second susceptors 130, 140 can be achieved irrespective of the magnetic field applied to the susceptors by selecting the material from which the susceptors are made.

In accordance with one embodiment, each susceptor 130, 140 is a layer or sheet of magnetically permeable material. Magnetically permeable materials for constructing the susceptors 130, 140 may include ferromagnetic materials that have an approximately 10-fold decrease in magnetic permeability when heated to a temperature higher than the respective Curie temperature of the susceptors. Such a large drop in permeability at the critical temperature promotes temperature control of the susceptors and, as a result, temperature control of the second susceptor 140, caul sheet 160, and material 170 being formed into a desired shape during the method 300 as will be described in more detail below. Ferromagnetic materials may include iron, cobalt, nickel, gadolinium and dysprosium, and alloys thereof. The material composition of the ferromagnetic material of the susceptors 130, 140 is chosen to produce a set temperature point to which the susceptors 130, 140 are heated in response to the magnetic field (e.g., electromagnetic energy) generated by the electromagnetic coils 114A, 114B. In this regard, the susceptors 130, 140 may be constructed such that the Curie point of the susceptors, at which there is a transition between the ferromagnetic and paramagnetic phases of the material, defines the set temperature point to which the susceptors are inductively heated.

The ferromagnetic materials of the susceptors 130, 140 are selected such that the Curie temperatures of the susceptors are different. More specifically, the material of the first susceptor 130 has a Curie temperature higher than the material of the second susceptor 140. Accordingly, the first susceptor 130 can be considered a high-temperature susceptor and the second susceptor 140 can be considered a low-temperature susceptor. The materials and associated Curie temperatures of the susceptors 130, 140 are selected according to a desired deformation temperature of the tooling sheets and material 170 being deformed into a desired shape. For example, the material of the first susceptor 130 is selected to have a Curie temperature corresponding with (e.g., approximately the same as or at least as high as) a desired deformation temperature of the second susceptor 140 and caul sheet 160. Similarly, the material of the first susceptor 130 is selected to have a Curie temperature corresponding with (e.g., approximately the same as or at least as high as) a desired deformation temperature of the material 170. The desired deformation temperature of the second susceptor 140 and caul sheet 160 can be associated with a temperature of the second susceptor and caul sheet are sufficiently softened or weakened that deformation of the second susceptor and caul sheet can occur in a desirably and efficient manner. According to one specific implementation, the desired deformation temperature of the second susceptor 140 and caul sheet 160 is a temperature associated with a 50 ksi drop in strength or 50% reduction in strength of the second susceptor and caul sheet. In contrast, the desired deformation temperature of the material 170 can be associated with a melting temperature of the material, such as the melting temperature of a thermoplastic matrix of the material.

The first susceptor 130 is made from a relatively inexpensive and disposable material designed to be discarded after a one-time use. In some embodiments, the first susceptor 130 is made from a low-carbon steel, or other similar material. The material of the first susceptor 130 has a relatively high Curie temperature, such as between about 1,000° F. and about 1,500° F. in some implementations, and at least 1,400° F. in other implementations.

In contrast, the second susceptor 140 is made from a relatively more expensive material designed for repetitive use. In some embodiments, the second susceptor 140 is made from a nickel-iron-molybdenum alloy (e.g., HyMu 80® made by Carpenter Technology Corporation of Reading, Pa.), or other similar material. The material of the second susceptor 140 has a relatively low Curie temperature, such as between about 700° F. and about 1,000° F., in some implementations, or at most between about 1,000° F. and about 750° F., in other implementations.

Optionally, the method 300 also includes positioning the caul sheet 160 between the forming surfaces 116A, 116B of the first and second dies 112A, 112B at 330 such that the second susceptor 140 is interposed between the caul sheet and the first susceptor 130. More specifically, the lower sheet 140B of the second susceptor 140 is interposed between the caul sheet and the lower sheet 130B of the first susceptor 130. The caul sheet 160 has a substantially sheet-like shape with a thickness that is significantly smaller than a width or length of the sheet.

A caul sheet, such as caul sheet 160, is positioned between the first and second dies 112A, 112B in this manner, and later formed, to provide a layer adjacent the material 170 that has a CTE similar to the material 170. When the material 170 is positioned adjacent a tooling sheet having a significantly different CTE, folding, wrinkling, or other defects, may occur in the material 170 during the formation of the material due to the uneven expansion of the tooling sheet and material 170. To prevent such defects in the material 170, if the second susceptor 140 has a significantly different CTE than the material 170, the caul sheet 160 can be positioned as defined above to act as the tooling sheet adjacent the material 170. Accordingly, the material of the caul sheet 160 is selected to have a CTE corresponding with (e.g., substantially matching or equal to) the CTE of the material 170. In some implementations, the CTE of the caul sheet 160 is between about 0.9 and about 1.1 times the CTE of the material 170. Because materials 170 made from thermoplastic resins and composite fibers typically have a low CTE, while the material of the second susceptor 140 likely has a high CTE by comparison, a caul sheet 160 may be desirable for forming such materials 170 into the desirable shape. However, for materials 170, such as metals and metal alloys, where the CTE of the materials is similar to the CTE of the second susceptor 140, a caul sheet 160 may not be needed.

The caul sheet 160 can be formed of any of various materials that have a CTE corresponding with the CTE of the material 170. Because the caul sheet 160 is configured for repetitive use, the material of the caul sheet 160 also has a relatively high durability. In one implementation, the caul sheet 160 is made from a nickel-iron alloy (e.g., Invar 42® made by Re-Steel of Denver, Colo.). The material of the caul sheet 160 has a relatively low CTE, such as between about $4 \times 10^{-4}$ in/in/° F. and about $9 \times 10^{-4}$ in/in/° F., in some implementations, and less than $7 \times 10^{-4}$ in/in/° F., in other implementations.

The method 300 additionally includes positioning a first bladder 150 between the forming surfaces 116A, 116B of the first and second dies 112A, 112B at 340 such that the caul sheet 160 is interposed between the first bladder 150 and the second susceptor 140. More specifically, the caul sheet 160 is interposed between the first bladder 150 and the lower sheet 140B of the second susceptor 140. If a caul sheet 160 is not used, the first bladder 150 is positioned such that the second susceptor 140 is directly interposed between the first bladder 150 and the first susceptor 130. The first bladder 150 includes opposing sidewalls 150A, 150B that define a substantially hollow interior 171 (see, e.g., FIG. 2) defined between the sidewalls. The hollow interior 171 is enclosed but for a single opening 154 configured to receive a fluid from a pneumatic source 120 via a fluid conduit 122. As shown by directional arrow in FIG. 2, fluid from the pneumatic source 120 enters the hollow interior 171 through the opening 154 to inflate the first bladder 150. The fluid can be any of various fluids, such as air or other gases.

The first bladder 150 is made from a relatively inexpensive and disposable material designed to be discarded after a one-time use. In some embodiments, the first bladder 150 is made from a low-carbon steel, or other similar material. The material of the first bladder 150 is generally rigid and non-deformable at lower temperatures, and flexible and deformable at higher temperatures. Accordingly, at lower temperatures, the first bladder 150 is non-inflatable (i.e., no more than nominally inflatable), but at higher temperatures, the first bladder 150 is inflatable to increase the volume of the hollow interior 170 and outwardly expand the first bladder within the space 118.

Figure 2:
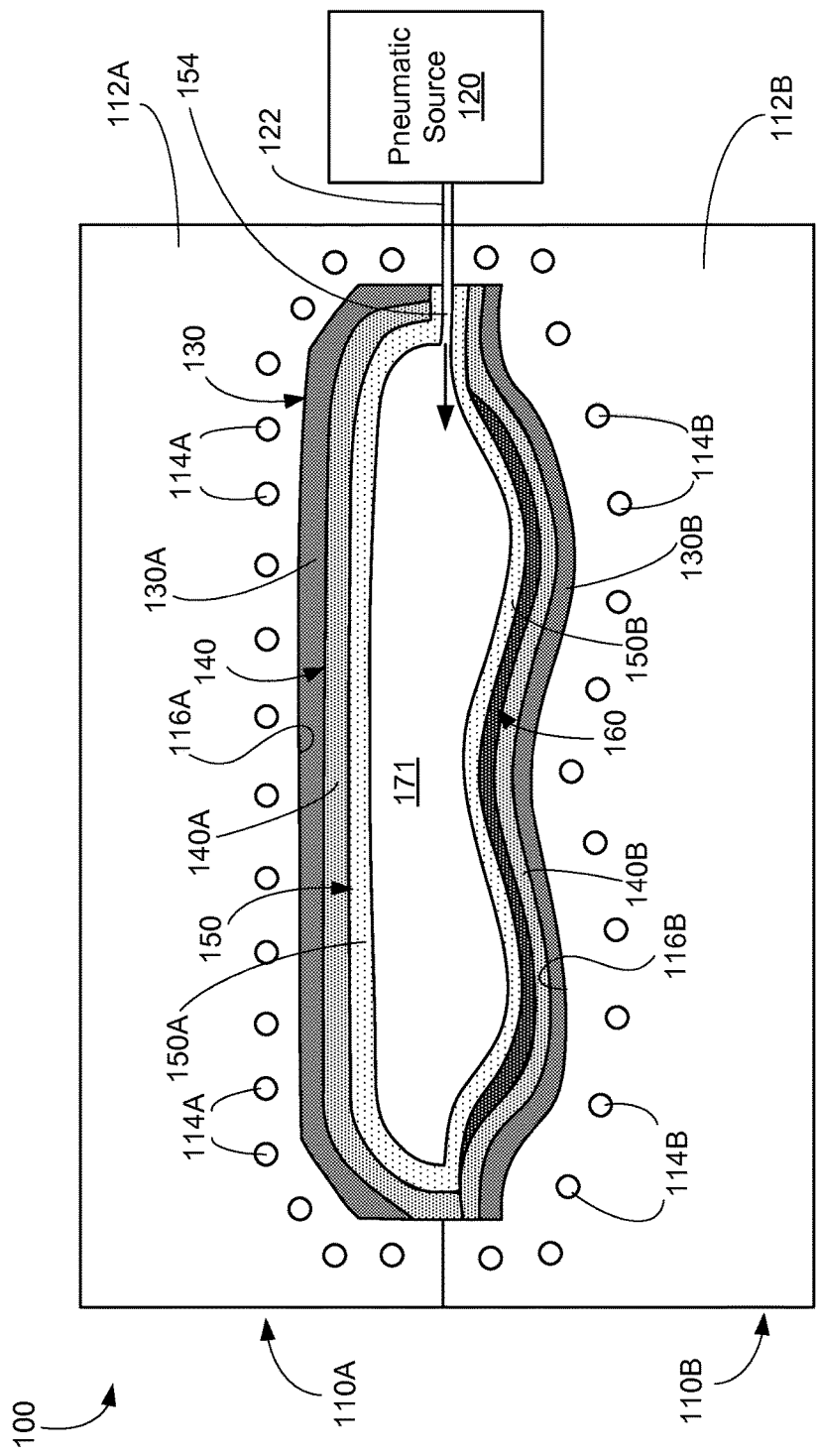
FIG. 2 is a schematic side view of one embodiment of the apparatus of FIG. 1 with the apparatus shown in a second stage of a manufacturing process.

Referring to FIGS. 2 and 8, the method 300 further includes inflating the first bladder 150 to deform the first susceptor 130, second susceptor 140, and caul sheet 160 into a desired shape at 350. Prior to inflating the first bladder 150, the first and second dies 112A, 112B are moved toward each other to engage the interface surfaces 113A, 113B and enclose the space 118 as shown in FIG. 2. Inflating the first bladder 150 includes introducing a fluid into the hollow interior 171 of the first bladder until a pressure within the first bladder reaches a desired pressure. The desired pressure may be between about 100 psi and about 300 psi in some embodiments.

The pressure within the hollow interior 171 drives outward expansion of the first bladder 150 and applies outwardly directed pressure to the second susceptor 140 and the caul sheet 160. The pressure on the second susceptor 140 and caul sheet 160 is transmitted to the first susceptor 130 via contact between the first susceptor and the second susceptor and caul sheet. The outwardly directed pressure acting directly or indirectly on the first susceptor 130, second susceptor 140, and caul sheet 160 via the first bladder 150 outwardly deforms the first susceptor, second susceptor, and caul sheet. The first susceptor 130 outwardly deforms until making contact with the forming surfaces 116A, 116B, which impede and shape the deformation of the first susceptor 130. In other words, the outwardly directed pressure drives the first susceptor 130 into the forming surfaces 116A, 116B with the first susceptor 130 deforming to take the shape of the forming surfaces 116A, 116B. In a similar manner, the second susceptor 140 is driven into the first susceptor 130 with the second susceptor 140 deforming to take the shape of the first susceptor 130. Likewise, the caul sheet 160 is driven into the second susceptor 140 (e.g., the lower sheet 140B of the second susceptor) with the caul sheet 160 deforming to take the shape of the second susceptor 140. In this manner, the first susceptor 130, second susceptor 140, and caul sheet 160 are deformed into a desired shape corresponding with the shape of the forming surface 116B. The pressure within the first bladder 150 may be incrementally released over time, such as via a release valve in fluid communication with the hollow interior 171 or the opening 154.

Prior to and during inflation of the first bladder 150, in order to convert the first susceptor 130, second susceptor 140, and caul sheet 160 into a state conducive to deformation, and the first bladder into a state conducive to inflation, the first susceptor, second susceptor, first bladder, and caul sheet are heated to soften and weaken the first susceptor, second susceptor, first bladder, and caul sheet. To heat the first susceptor 130, caul sheet 160, and first bladder 150, the first susceptor 130 is heated up to the Curie temperature of the first susceptor via induction by applying a magnetic field of a sufficient intensity and duration to the first susceptor. As described above, the magnetic field is generated by activating one or more of the electromagnetic coils 114A, 114B. Heat from the first susceptor 130 is transferred to the second susceptor 140 via conduction. Similarly, heat from the second susceptor 140 is transferred to the caul sheet 160 via conduction. Also, heat from both the second susceptor 140 and the caul sheet 160 is transferred to the first bladder 150. Over time, the temperatures of the first susceptor 130, second susceptor 140, first bladder 150, and caul sheet 160 reach temperatures conducive to deformation. The temperatures of the first susceptor 130, second susceptor 140, first bladder 150, and caul sheet 160 conducive to deformation can be less than or equal to the Curie temperature of the first susceptor.

Figure 7:
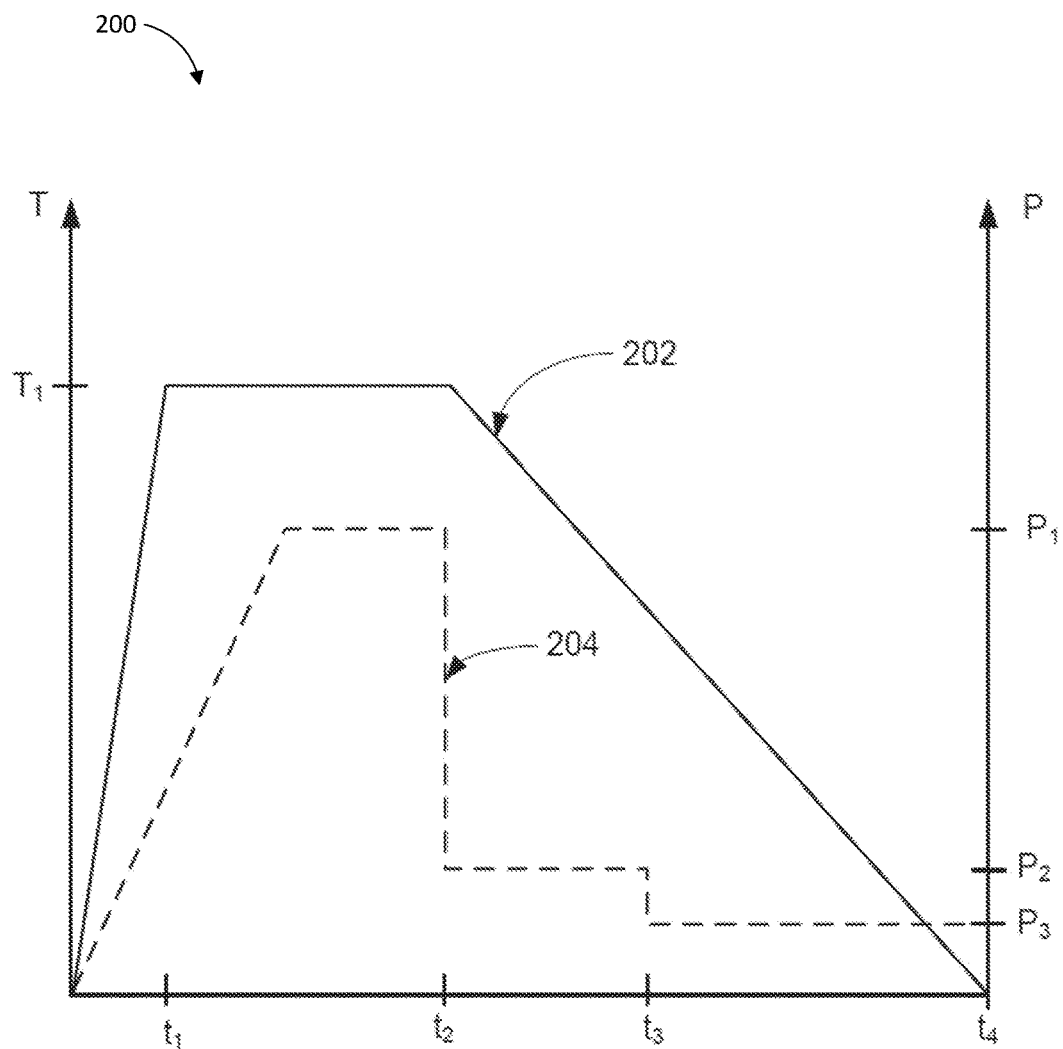
FIG. 7 is a chart illustrating a comparison between temperature and pressure over time during one embodiment of a process for forming a material into a desired shape.

Referring to FIG. 7, according to one embodiment, a chart 200 includes the temperature T of a susceptor and a pressure within the first bladder 150 versus time. In the context of the temperature of the first susceptor 130, the plot 202 of the temperature T indicates that the temperature of the first susceptor 130 steadily increases from an initial temperature at a start of the heating process to a temperature T1 at a first time t1. In the present embodiment, the temperature T1 can be equal to the Curie temperature of the first susceptor 130. The first susceptor 130 remains steady at the temperature T1 from the first time t1 to a second time t2, when the temperature T of the first susceptor 130 steadily decreases to a fourth time t4. In operation, the electromagnetic coils 114A, 114B are activated to generate a magnetic field from the start of the heating process and remain activated until the second time t2 when the electromagnetic coils are deactivated and the first susceptor 130 is allowed to cool.

In the context of the pressure within the first bladder 150, the plot 204 of the pressure P indicates the pressure within the first bladder increases from before and after the first time t1 to a first pressure P1. The pressure of the first bladder 150 remains steady at the first pressure P1 for a time until at the second time t2, the pressure P of the first bladder drops to a second pressure P2. Then, the pressure of the first bladder 150 remains at the second pressure P2 until a third time t3 when the pressure drops to a third pressure P3. The pressure of the first bladder 150 remains at the third pressure P3 until the fourth time t4 when the pressure drops to ambient pressure. As an example only, in one implementation, the first pressure P1 is about 250 psi, the second pressure P2 is about 50 psi, and the third pressure P3 is about 10 psi.

Referring to FIGS. 3 and 8, after the first bladder 150 is inflated to deform the first susceptor 130, second susceptor 140, and caul sheet 160 into the desired shape, the method 300 includes removing the first susceptor 130 and first bladder 150 from between the first and second dies 112A, 112B at 360. Prior to removing the first susceptor 130 and first bladder 140, the first and second dies 112A, 112B are moved away from each other to open the space 118 as shown in FIG. 3. The first susceptor 130 and first bladder 150 may be allowed to cool before removing them from the first and second dies 112A, 112B. In some implementations, the first susceptor 130 and first bladder 150 may be forcibly cooled to accelerate the cooling process. As shown in FIG. 3, after removal of the first susceptor 130 and first bladder 150 at 360, the second susceptor 140 and the caul sheet 160, being deformed into the desired shape, remain between the first and second dies 112A, 112B.

Referring to FIGS. 4A and 8, the method 300 includes positioning a material 170 to be formed between the forming surfaces 116A, 116B of the first and second dies 112A, 112B at 370 such that the caul sheet is positioned between the material and the second susceptor 140. More specifically, the caul sheet 160 is interposed between the material 170 and the lower sheet 140B of the second susceptor 140. The material 170 may be in the form of a single layer or multi-layered sheet. Accordingly, a thickness of the material 170 is significantly smaller than a width or length of the material. The area of the material 170 is generally no larger than an area of the caul sheet 160 such that every portion of the material 170 deforms against the caul sheet as described below. As defined above, the material 170 can be any of various materials capable of deformation under heat and pressure known in the art.

In the illustrated embodiment, the material 170 is a material with a relatively low CTE, such as fibrous composite materials, and a caul sheet 160 is used. Fibrous composite materials include fibers or fibrous elements suspended in a matrix binder. Prior to formation into a formed component, the material 170 may be an unconsolidated composite material that is formed into a consolidated composite material by the apparatus 100. The material 170 may be pre-impregnated with the matrix binder to form a composite lay-up. The fibers can be multidirectional or unidirectional. The matrix binder can be a polymeric resin, such as a thermoplastic or thermoset resin, and the fibers can include any of various fibers, such as carbon, glass, ceramic, and the like. The matrix binder has a predetermined or preset melting temperature at which the matrix binder melts to consolidate the material. Additionally, the material 170 may include one sheet or multiple sheets of fibrous composite materials. Under heat and pressure, the matrix binder is melted and the unconsolidated fibrous composite material 170 is at least partially consolidated. In the case of a multi-sheet fibrous composite material, the matrix of adjacent sheets meld together to consolidate the multiple sheets into a single sheet or panel of fibrous composite material.

In some embodiments, the material 170 is a material with a relatively high CTE, such as a metal, metal alloy, or superalloy, and a caul sheet 160 is not used. In some specific implementations, the material 170 is one of aluminum, titanium, and titanium aluminide.

Again, referring to FIGS. 4A and 8, the method 300 further includes positioning a second bladder 152 between the forming surfaces 116A, 116B of the first and second dies 112A, 112B at 380 such that the material 170 is interposed between the second bladder 152 and the caul sheet 160. More specifically, the material 170 is interposed between the second bladder 152 and the caul sheet 160. The material 170 is shown as a non-configured or unshaped material prior to being formed or consolidated by the second bladder 152. For example, the material 170 can be a substantially two-dimensional planar sheet of material when positioned between the first and second dies 114A, 114B. If a caul sheet 160 is not used, the second bladder 152 is positioned such that the material 170 is interposed directly between the second bladder 152 and the second susceptor 140. The second bladder 152 includes opposing sidewalls 152A, 152B that define a substantially hollow interior 172 (see, e.g., FIG. 5) defined between the sidewalls. The hollow interior 172 is enclosed but for a single opening 156 configured to receive a fluid from a pneumatic source 120 via a fluid conduit 122. As shown by directional arrow in FIG. 5, fluid from the pneumatic source 120 enters the hollow interior 172 through the opening 156 to inflate the second bladder 152. As with the first bladder 150, the fluid can be any of various fluids, such as air or other gases.

The second bladder 152 is made from a relatively expensive and non-disposable material designed for multiple uses. In some embodiments, the second bladder 152 is made from aluminum, or other similar material. The material of the second bladder 152 is generally rigid and non-deformable at lower temperatures, and flexible and deformable at higher temperatures. Accordingly, at lower temperatures, the second bladder 152 is non-inflatable, but at higher temperatures, the second bladder 152 is inflatable to increase the volume of the hollow interior 172 and outwardly expand the second bladder within the space 118.

Figure 5:
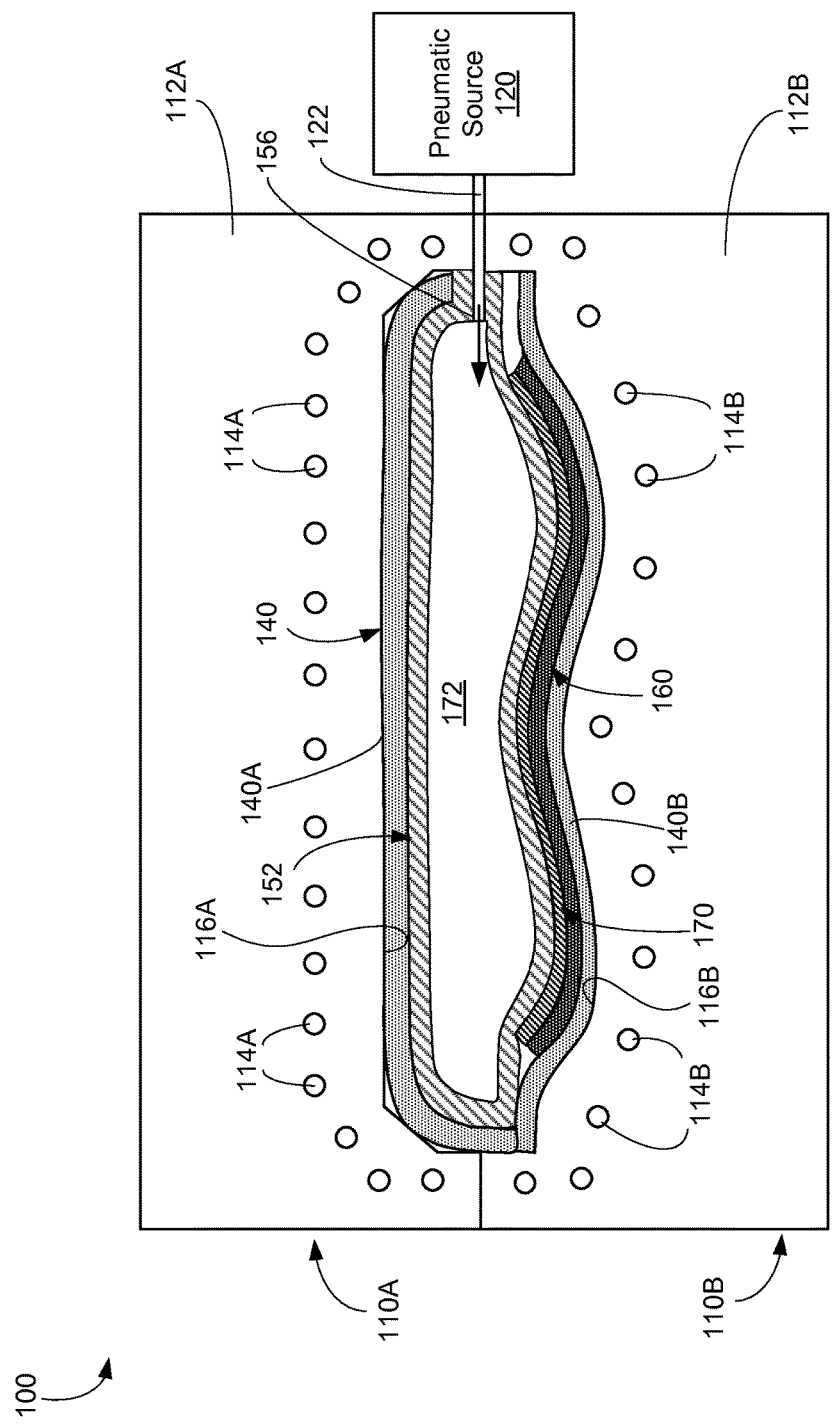
FIG. 5 is a schematic side view of one embodiment of the apparatus of FIG. 1 with the apparatus shown in a fifth stage of a manufacturing process.

Referring to FIGS. 5 and 8, the method 300 includes inflating the second bladder 152 to deform the material 170 into a desired shape at 390. Prior to inflating the second bladder 152, the first and second dies 112A, 112B are moved toward each other to engage the interface surfaces 113A, 113B and enclose the space 118 as shown in FIG. 5. Inflating the second bladder 152 includes introducing a fluid into the hollow interior 172 of the second bladder until a pressure within the second bladder reaches a desired pressure. The desired pressure within the second bladder may be between about 100 psi and about 300 psi in some embodiments. Furthermore, in some implementations, the desired pressure within the second bladder 152 to deform the material 170 may be less than the desired pressure within the first bladder 150 to deform the second susceptor 140 and the caul sheet 160.

The pressure within the hollow interior 172 drives outward expansion of the second bladder 152 and applies outwardly directed pressure to the material 170. The outwardly directed pressure acting on the material 170 via the second bladder 152 outwardly deforms the material. The material 170 outwardly deforms until making contact with the surface of the caul sheet 160, which impedes and shapes the deformation of the material 170. In other words, the outwardly directed pressure drives the material 170 into the surface of the caul sheet 160 having the desired shape with the material deforming to take the desired shape of the of the caul sheet 160. In this manner, the material 170 is deformed into a desired shape corresponding with the shape of the forming surface 116B. The pressure within the second bladder 152 may be incrementally released over time, such as via a release valve in fluid communication with the hollow interior 172. It is noted that for embodiments without a caul sheet 160, inflation of the second bladder 152 drives the material 170 into the surface of the lower sheet 140B of the second susceptor 140.

Figure 4B:
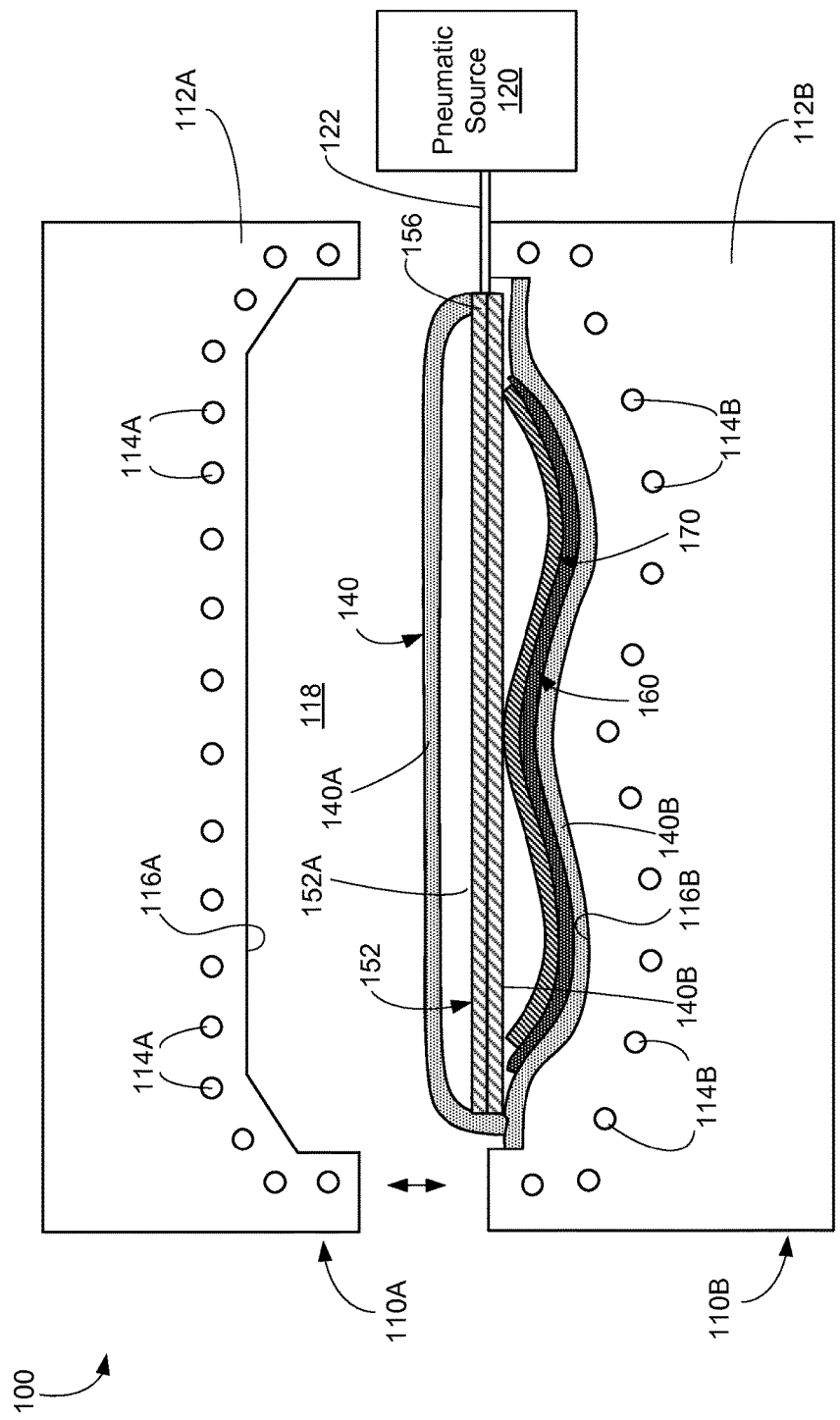
FIG. 4B is a schematic side view of one embodiment of the apparatus of FIG. 1 with the apparatus shown in a fourth stage of a manufacturing process with a pre-configured material.

In contrast to FIG. 4A, as shown in FIG. 4B, the material 170 can be pre-configured or shaped prior to being formed or consolidated by the second bladder 152. For example, the material 170 can be a substantially three-dimensional contoured sheet of material when positioned between the first and second dies 114A, 114B. In such an embodiment, inflation of the second bladder 152 acts to primarily consolidate the material 170, rather than shape the material. The second bladder 152 can remain fully or at least partially inflated prior to and while the pre-configured material 170 is positioned between the first and second dies 114A, 114B. In this manner, after one material 170 is consolidated, the second bladder 152 does not need to be fully deflated prior to consolidating a subsequent material.

Prior to and during inflation of the second bladder 152, in order to convert the material 170 into a state conducive to deformation, and the second bladder 152 into a state conducive to inflation, the material and second bladder are heated to soften and weaken the material and second bladder. To heat the material 170 and second bladder 152, the second susceptor 140 is heated up to the Curie temperature of the second susceptor via induction by applying a magnetic field of a sufficient intensity and duration to the second susceptor. As described above, the magnetic field is generated by activating one or more of the electromagnetic coils 114A, 114B. Heat from the second susceptor 140 is transferred to the material 170 via conduction. Similarly, heat from the second susceptor 140 is transferred to the second bladder 152 via conduction. Over time, the temperatures of the second susceptor 140, second bladder 152, and material 170 reach temperatures conducive to deformation. The temperatures of the second susceptor 140, second bladder 152, and material 170 conducive to deformation can be less than or equal to the Curie temperature of the second susceptor.

Referring to FIG. 7, in the context of the temperature of the second susceptor 140, the plot 202 of the temperature T indicates that the temperature of the second susceptor steadily increases from an initial temperature at a start of the heating process to a temperature T1 at a first time t1. In the present embodiment, the temperature T1 can be equal to the Curie temperature of the second susceptor 140. The second susceptor 140 remains steady at the temperature T1 from the first time t1 to a second time t2, when the temperature T of the second susceptor 140 steadily decreases to a fourth time t4. In operation, the electromagnetic coils 114A, 114B are activated to generate a magnetic field from the start of the heating process and remain activated until the second time t2 when the electromagnetic coils are deactivated and the second susceptor 140 is allowed to cool.

In the context of the pressure within the second bladder 152, the plot 204 of the pressure P indicates the pressure within the second bladder increases from before and after the first time t1 to a first pressure P1. The pressure of the second bladder 152 remains steady at the first pressure P1 for a time until at the second time t2, the pressure P of the second bladder drops to a second pressure P2. Then, the pressure of the second bladder 152 remains at the second pressure P2 until a third time t3 when the pressure drops to a third pressure P3. The pressure of the second bladder 152 remains at the third pressure P3 until the fourth time t4 when the pressure drops to ambient pressure. As an example only, in one implementation, the first pressure P1 is about 200 psi, the second pressure P2 is about 50 psi, and the third pressure P3 is about 10 psi.

Figure 6:
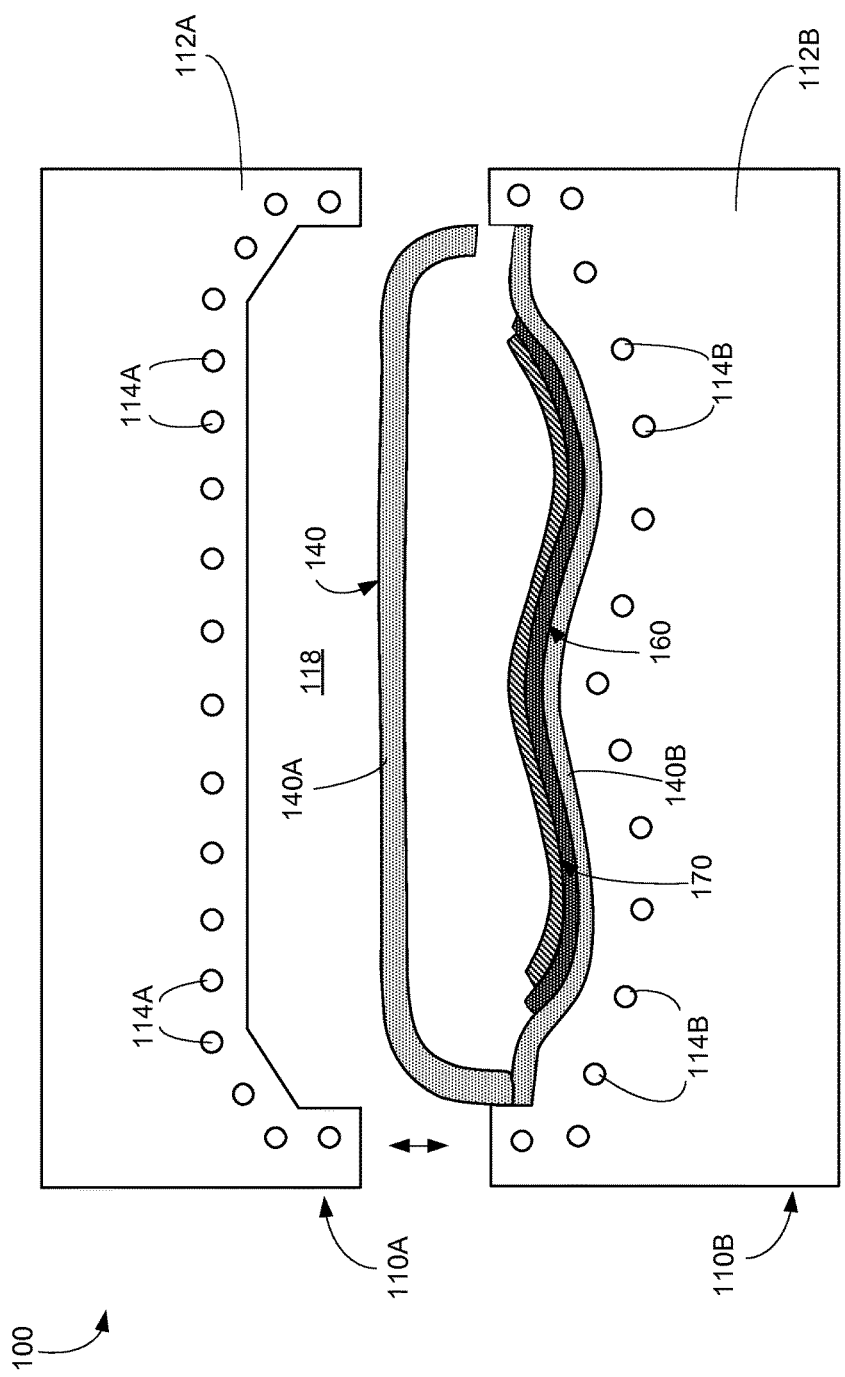
FIG. 6 is a schematic side view of one embodiment of the apparatus of FIG. 1 with the apparatus shown in a sixth stage of a manufacturing process.

Referring to FIGS. 6 and 8, after the second bladder 152 is inflated to deform the material 170 into the desired shape, the material can be removed from between the first and second dies 112A, 112B. Prior to removing the material 170, the first and second dies 112A, 112B are moved away from each other to open the space 118 as shown in FIG. 6. The material 170 may be allowed to cool before removing it from the first and second dies 112A, 112B. In some implementations, the material 170 may be forcibly cooled to accelerate the cooling process.

After the material 170 is formed, the second bladder 152 can be reused to form another material. The second bladder 152 may remain between the first and second dies 112A, 112B while the material 170 is being removed. Alternatively, the second bladder 152 may be removed prior to removal of the material 170, but then repositioned between the first and second dies 112A, 112B after removal of the material. In some implementations, the second bladder 152 is deflated prior to cooling, such that when cooled the second bladder has substantially the same shape after being inflated as before being inflated. Then the cooled second bladder 152 can be reheated and reinflated to form another material 170 (i.e., repeat steps 370-390 of the method 300 for another material).

Generally, the components between the first and second dies 112A, 112B as shown in FIGS. 1 and 4A are stacked relative to each other such that one component is directly adjacent or abutting one or more adjacent components. In other words, in some embodiments, there are no intermediate components between the components shown in FIGS. 1 and 4A. However, in other embodiments, intermediate components or layers may be interposed between two or more adjacent components of the components shown in FIGS. 1 and 4A.

In the above description, certain terms may be used such as "up," "down," "upper," "lower," "horizontal," "vertical," "left," "right," "over," "under" and the like. These terms are used, where applicable, to provide some clarity of description when dealing with relative relationships. But, these terms are not intended to imply absolute relationships, positions, and/or orientations. For example, with respect to an object, an "upper" surface can become a "lower" surface simply by turning the object over. Nevertheless, it is still the same object. Further, the terms "including," "comprising," "having," and variations thereof mean "including but not limited to" unless expressly specified otherwise. An enumerated listing of items does not imply that any or all of the items are mutually exclusive and/or mutually inclusive, unless expressly specified otherwise. The terms "a," "an," and "the" also refer to "one or more" unless expressly specified otherwise. Further, the term "plurality" can be defined as "at least two."

Additionally, instances in this specification where one element is "coupled" to another element can include direct and indirect coupling. Direct coupling can be defined as one element coupled to and in some contact with another element. Indirect coupling can be defined as coupling between two elements not in direct contact with each other, but having one or more additional elements between the coupled elements. Further, as used herein, securing one element to another element can include direct securing and indirect securing. Additionally, as used herein, "adjacent" does not necessarily denote contact. For example, one element can be adjacent another element without being in contact with that element.

As used herein, the phrase "at least one of", when used with a list of items, means different combinations of one or more of the listed items may be used and only one of the items in the list may be needed. The item may be a particular object, thing, or category. In other words, "at least one of" means any combination of items or number of items may be used from the list, but not all of the items in the list may be required. For example, "at least one of item A, item B, and item C" may mean item A; item A and item B; item B; item A, item B, and item C; or item B and item C. In some cases, "at least one of item A, item B, and item C" may mean, for example, without limitation, two of item A, one of item B, and ten of item C; four of item B and seven of item C; or some other suitable combination.

Unless otherwise indicated, the terms "first," "second," etc. are used herein merely as labels, and are not intended to impose ordinal, positional, or hierarchical requirements on the items to which these terms refer. Moreover, reference to, e.g., a "second" item does not require or preclude the existence of, e.g., a "first" or lower-numbered item, and/or, e.g., a "third" or higher-numbered item.

The schematic flow chart diagrams included herein are generally set forth as logical flow chart diagrams. As such, the depicted order and labeled steps are indicative of one embodiment of the presented method. Other steps and methods may be conceived that are equivalent in function, logic, or effect to one or more steps, or portions thereof, of the illustrated method. Additionally, the format and symbols employed are provided to explain the logical steps of the method and are understood not to limit the scope of the method. Although various arrow types and line types may be employed in the flow chart diagrams, they are understood not to limit the scope of the corresponding method. Indeed, some arrows or other connectors may be used to indicate only the logical flow of the method. For instance, an arrow may indicate a waiting or monitoring period of unspecified duration between enumerated steps of the depicted method. Additionally, the order in which a particular method occurs may or may not strictly adhere to the order of the corresponding steps shown.

The present subject matter may be embodied in other specific forms without departing from its spirit or essential characteristics. The described embodiments are to be considered in all respects only as illustrative and not restrictive. All changes which come within the meaning and range of equivalency of the claims are to be embraced within their scope.

What is claimed is:

1. A method of forming tooling used to form a material, comprising:
positioning a first susceptor made from a first susceptor material between first and second dies, wherein at least one of the first and second dies comprises a forming surface having a desired shape;
positioning a second susceptor made from a second susceptor material between the first and second dies such that the first susceptor is interposed between the second susceptor and the forming surface, wherein the first susceptor material has a first Curie temperature that is higher than a deformation temperature of the second susceptor material;
positioning a first bladder between the first and second dies such that the second susceptor is interposed between the first bladder and the first susceptor; and
inflating the first bladder to concurrently deform the first susceptor and second susceptor into the desired shape.

2. The method of claim 1, wherein the second susceptor material has a second Curie temperature lower than the first Curie temperature, the method further comprising applying a magnetic field to the first susceptor to heat via induction the first susceptor to at least the first Curie temperature prior to inflating the first bladder.

3. The method of claim 2, wherein the first and second dies each comprises embedded electromagnetic coils, the magnetic field being generated by at least one of the electromagnetic coils.

4. The method of claim 1, wherein the first susceptor material comprises a low-carbon steel and the second susceptor material comprises a nickel-iron-molybdenum alloy.

5. The method of claim 1, further comprising positioning a caul sheet between the first and second dies such that the second susceptor is interposed between the caul sheet and the first susceptor and the caul sheet is interposed between the first bladder and the second susceptor, wherein inflating the first bladder concurrently deforms the first susceptor, second susceptor, and caul sheet into the desired shape.

6. The method of claim 5, wherein the caul sheet is made from a material having a coefficient of thermal expansion (CTE) less than about $7 \times 10^{-4}$ in/in/° F.

7. The method of claim 5, wherein the caul sheet is made from a nickel-iron alloy.

8. The method of claim 5, wherein:
the first susceptor comprises a first sheet and a second sheet;
the second susceptor comprises a third sheet and a fourth sheet interposed between the first sheet and second sheet of the first susceptor;
the caul sheet is interposed between the third sheet and fourth sheet of the second susceptor;
the first bladder is interposed between the third sheet of the second susceptor and the caul sheet;
deformation of the first susceptor comprises deforming the second sheet of the first susceptor into the desired shape; and
deformation of the second susceptor comprises deforming the fourth sheet of the second susceptor into the desired shape.

9. The method of claim 5, further comprising moving the first and second dies toward each other to enclose the first susceptor, second susceptor, caul sheet, and first bladder between the first and second dies prior to inflating the first bladder.

10. A method of forming a component made from a composite material, comprising:
positioning a first susceptor made from a first susceptor material between first and second dies, wherein at least one of the first and second dies comprises a forming surface having a desired shape;
positioning a second susceptor made from a second susceptor material between the first and second dies such that the first susceptor is interposed between the second susceptor and the forming surface;
positioning a caul sheet between the first and second dies such that the second susceptor is interposed between the caul sheet and the first susceptor;
positioning a first bladder between the first and second dies such that the caul sheet is interposed between the first bladder and the second susceptor;
inflating the first bladder to concurrently deform the first susceptor, second susceptor, and caul sheet into the desired shape;
after inflating the first bladder to deform the first susceptor, second susceptor, and caul sheet into the desired shape, removing the first susceptor and first bladder from between the first and second dies;
after removing the first susceptor and first bladder from between the first and second dies:
positioning an unconsolidated composite material between the first and second dies such that the caul sheet is interposed between the unconsolidated composite material and the second susceptor; and
positioning a second bladder between the first and second dies such that the unconsolidated composite material is interposed between the second bladder and the caul sheet; and
inflating the second bladder to deform the unconsolidated composite material into the desired shape.

11. The method of claim 10, wherein the first susceptor material has a first Curie temperature and the second susceptor material has a second Curie temperature lower than the first Curie temperature, the method further comprising applying a first magnetic field to the first susceptor to heat via induction the first susceptor to the first Curie temperature prior to inflating the first bladder.

12. The method of claim 11, wherein after removing the first susceptor and first bladder from between the first and second dies, the method further comprising applying a second magnetic field to the second susceptor to heat via induction the second susceptor to the second Curie temperature prior to inflating the second bladder.

13. The method of claim 12, wherein the first and second dies each comprises embedded electromagnetic coils, the first and second magnetic fields being generated by at least one of the electromagnetic coils.

14. The method of claim 12, wherein the unconsolidated composite material is configured to melt at a melting temperature, the second Curie temperature being at least as high as the melting temperature of the unconsolidated composite material.

15. The method of claim 10, wherein prior to positioning the unconsolidated composite material between the first and second dies, the method comprises pre-configuring the unconsolidated composite material into a shape complementing the desired shape.

16. The method of claim 10, wherein the first bladder is made from a first material and the second bladder is made from a second material different than the first material.

17. The method of claim 16, wherein the first bladder is made from a low-carbon steel and the second bladder is made from an aluminum alloy.

18. The method of claim 10, wherein:
the caul sheet has a first coefficient of thermal expansion (CTE) and the thermoplastic composite material has a second CTE; and
the first CTE is between about 0.9 and about 1.1 times the second CTE.

19. The method of claim 10, wherein:
the second susceptor comprises a first sheet and a second sheet;
the caul sheet is interposed between the first sheet and second sheet of the second susceptor;
the second bladder is interposed between the first sheet and second sheet of the second susceptor; and
the unconsolidated composite material is interposed between the second sheet of the second susceptor and the second bladder.

* * * * *